United States Patent
Yamada et al.

(10) Patent No.: US 6,547,653 B2
(45) Date of Patent: Apr. 15, 2003

(54) FERRULE HOLDER ASSEMBLY FOR OPTICAL-FIBER-END-FACE GRINDING APPARATUS (75) Inventors: Kunio Yamada, Matsudo (JP); Takehiko Narita, Funabashi (JP)

(73) Assignee: Seikoh Giken Co., Ltd. (JP)

( * ) Notice: Subject to any disclaimer, the term of this patent is extended or adjusted under 35 U.S.C. 154(b) by 0 days.

(21) Appl. No.: 09/748,225

(22) Filed: Dec. 27, 2000

(65) Prior Publication Data

US 2001/0055459 A1 Dec. 27, 2001

(30) Foreign Application Priority Data

Jun. 23, 2000 (JP) ........................................ 2000-188815

(51) Int. Cl.⁷ ............................................... B24B 41/06
(52) U.S. Cl. ........................ 451/364; 451/381; 451/386
(58) Field of Search ................................ 451/378, 367, 451/386, 391, 369, 370, 384, 381

(56) References Cited

U.S. PATENT DOCUMENTS

| 4,272,926 A | * | 6/1981 | Tamulevich ................ 451/364 |
| 4,445,743 A | * | 5/1984 | Bakker ..................... 339/90 R |
| 4,492,060 A | | 1/1985 | Clark |
| 4,539,776 A | | 9/1985 | Weaver, Jr. |
| 4,776,136 A | | 10/1988 | Abendschein et al. |
| 5,018,316 A | * | 5/1991 | Mulholland et al. ........ 451/364 |
| 5,201,148 A | | 4/1993 | Rupert et al. |
| 5,643,064 A | | 7/1997 | Grinderslev et al. |
| 5,720,653 A | | 2/1998 | Miller et al. |

FOREIGN PATENT DOCUMENTS

| JP | 62-28162 | 2/1987 |
| JP | 4-22920 | 5/1992 |
| JP | 8-168948 | 7/1996 |
| JP | 2704335 | 10/1997 |
| JP | 3078713 | 6/2000 |

* cited by examiner

Primary Examiner—George Nguyen
(74) Attorney, Agent, or Firm—Blank Rome LLP (57) ABSTRACT A ferrule holder assembly for an optical-fiber-end-face grinding apparatus comprises a ferrule holder board supported to be moved upward and downward in parallel with a grinding board of the optical-fiber-end-face grinding apparatus, a ferrule sleeve provided at the ferrule holder board for receiving and supporting an optical fiber ferrule while putting the tip at the grinding board, an adapter for retaining the optical fiber ferrule or a connector for supporting the optical fiber ferrule in a state where the optical fiber ferrule is inserted into the ferrule sleeve, and an urging unit for urging the adapter in a direction opposite to the grinding board from the ferrule holder board.

9 Claims, 7 Drawing Sheets

FERRULE HOLDER ASSEMBLY FOR OPTICAL-FIBER-END-FACE GRINDING APPARATUS

BACKGROUND OF THE INVENTION

1. Field of the Invention

The present invention relates to a ferrule holder assembly for an apparatus for grinding end faces of a plurality of ferrules with optical fibers simultaneously.

2. Description of the Related Art

It is well known by those skilled in the art that in order to connect optical fibers together while reducing connection loss and reflected returned light, tips of ferrules are ground by perpendicular or inclined spherical grinding to connect the optical fibers together. The shape of the convex spherical surface in this case is standardized by the international standard (IEC: International Electrotechnical Commission No. 60874-14-6) or the like. U.S. Pat. No. 5,351,445 discloses a technique of apparatus for grinding end faces of a plurality of optical fibers simultaneously. A ferrule holder of this grinding apparatus projects tips of ferrules from a plurality of insertion holes (sleeves) thereof to a grinding board by a specified amount and supports the ferrules. Grinding is performed by revolving a grinding film put on an elastic plate of the grinding board by an autorotational and orbital motion mechanism of the grinding apparatus and applying a specified amount of pressure to a grinding jig on which a plurality of ferrules with the optical fibers are mounted. Thus, the shape of the tips of the ferrules of the optical fibers can be made convex spherical surface that satisfies the standard.

Even if a similar type of ferrule or connector is used, however, variation in length exists within a dimensional tolerance and the size differs depending on the manufacturer. Therefore, when a plurality of ferrules or connectors are mounted on the ferrule holder, it is difficult that all the tips of the ferrules are projected by a specified amount and supported.

Although a reference plane of the ferrule holder for mounting the ferrule for grinding is processed to have a specified height with a strict tolerance, since the reference plane for mounting the plurality of ferrules is fixed, the heights of the tips of the ferrules from the insertion holes vary by an amount of variation in length of ferrules or housings of the ferrules.

When the plurality of end surfaces of the optical fiber connectors of a lot in which the lengths of ferrules vary are simultaneously ground, since the grinding holder is directly weighted in the conventional grinding apparatus, problems occur in that the holder is tilted due to the variation in projection amount therefrom to generate a deviation from the shaft axis, or the ferrules having a small projection amount are insufficiently ground. Therefore, in the method of the conventional grinding apparatus, it is necessary to perform preliminary grinding up to a shortest ferrule and then to perform grinding again from a state in which the ferrules have the same height.

SUMMARY OF THE INVENTION

Accordingly, it is an object of the present invention to provide a ferrule holder assembly for an optical-fiber-end-face grinding apparatus in which the aforesaid problems of the variation in length of the housings of the ferrules can be solved.

In order to achieve the above objects, a ferrule holder assembly for an optical-fiber-end-face grinding apparatus according to the present invention includes a ferrule holder board provided to be moved upward and downward in parallel with a grinding board of the optical-fiber-end-face grinding apparatus, a ferrule sleeve provided at the ferrule holder board for receiving and supporting an optical fiber ferrule while putting the tip thereof at the grinding board, an adapter for retaining the optical fiber ferrule or a connector for supporting the optical fiber ferrule in a state in which the optical fiber ferrule is inserted into the ferrule sleeve and urging means for urging the adapter in a direction to the grinding board from the ferrule holder board.

The adapter retains and supports the optical fiber ferrule or the connector for supporting the optical fiber ferrule at the ferrule holder board in such a manner that the ferrule can be slid to the ferrule sleeve in the axial direction thereof, its revolution is restricted, and the downward movement limit is specified relative to said ferrule holder board.

A retaining part of the adapter has a hook structure corresponding to a retaining member of a plug-type optical fiber connector housing.

A retaining part of the adapter has a screw structure corresponding to a retaining member of a plug-type optical-fiber connector housing.

The ferrule holder assembly for the optical-fiber-end face grinding apparatus is a ferrule holder assembly for an optical-fiber-end face grinding apparatus for inclined grinding, the attaching angle of said adapter is the same as that of the ferrule sleeve, and a guide key groove of the adapter is formed only at one side.

The urging means is a coil spring and the force of the spring is smaller than the urging force of springs assembled to the connector plug itself.

The means for urging the adapter to the holder is a coil spring and the weight is 550 gf or less appropriate for spherical grinding. The ferrule holder assembly for the optical-fiber-end-face grinding apparatus according to the present invention includes adapters in each of which the ferrule or the housing is fixed to a grinding-jig-plate main body thereof having a plurality of insertion holes penetrated for receiving the outside diameter of the tip of the ferrule. By pressing the adapter with a spring pressure, the ferrule with the optical fiber can apply a specified pressure toward a grinding board.

In this case as well, although the heights of the tips of the ferrules from the plurality of insertion holes vary, the pressure of the tips of the ferrules to the grinding board can be almost the same by setting a spring constant of a spring that presses the adapter small in spite of the variation in the ferrules and the housing, and thereby the variation can be absorbed. Thus, the variation in the shape of the tips of the plurality of ferrules after grinding can be reduced.

In addition, even in the inclined spherical grinding, the variation can be reduced by providing the insertion hole of the grinding-jig-plate main body in a manner so as to be inclined relative to the grinding surface, and also by inclining the adapter having a mechanism to be pressed by the spring pressure.

The object to be ground is not limited to the ferrule, but various kinds of connectors can be applied depending on the design of the adapter.

DESCRIPTION OF THE PREFERRED EMBODIMENTS

Figure 1:
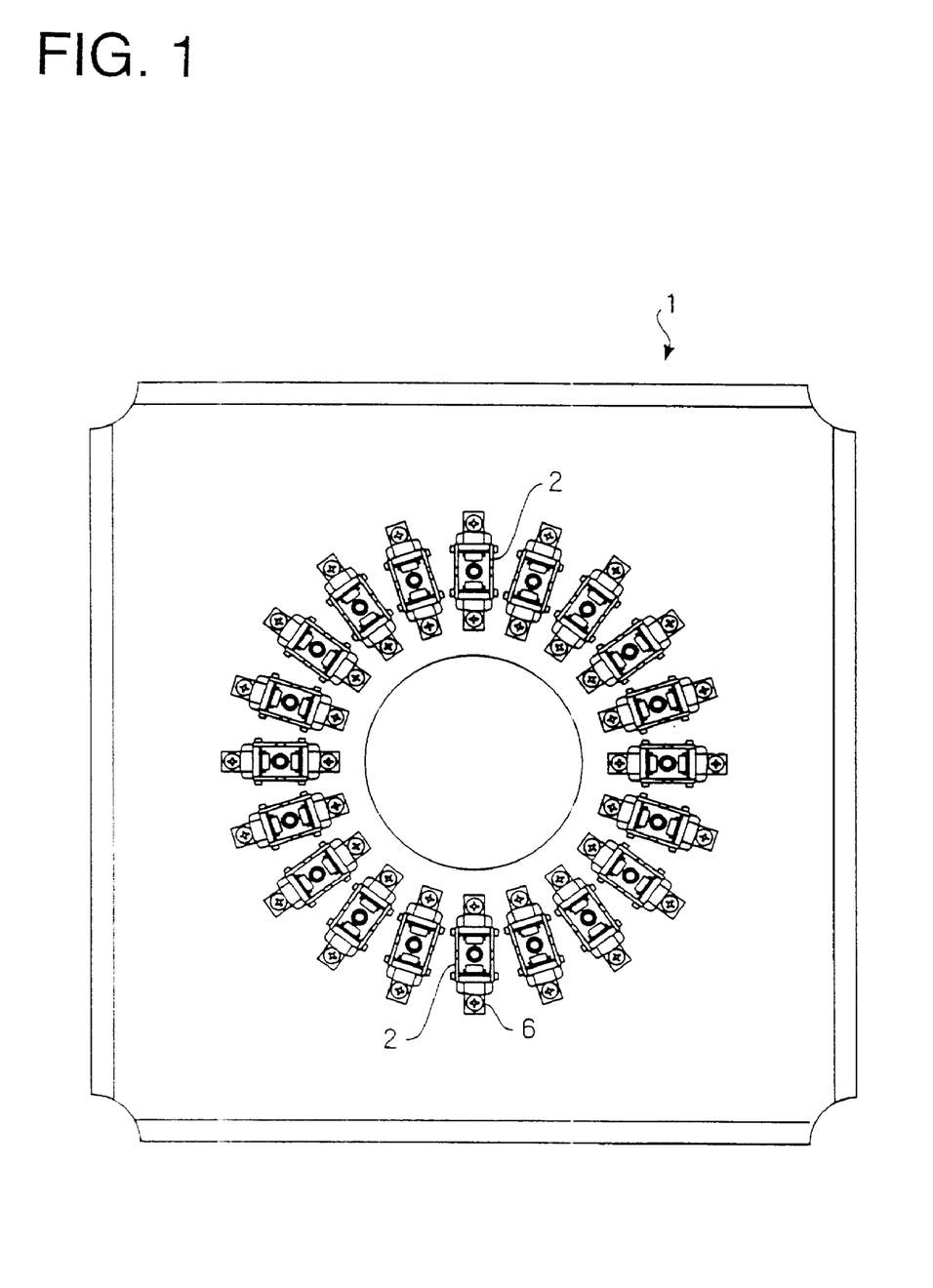
FIG. 1 is a plan view of an embodiment of a ferrule holder assembly for an optical-fiber-end-face grinding apparatus according to an embodiment of the present invention.
Figure 2:
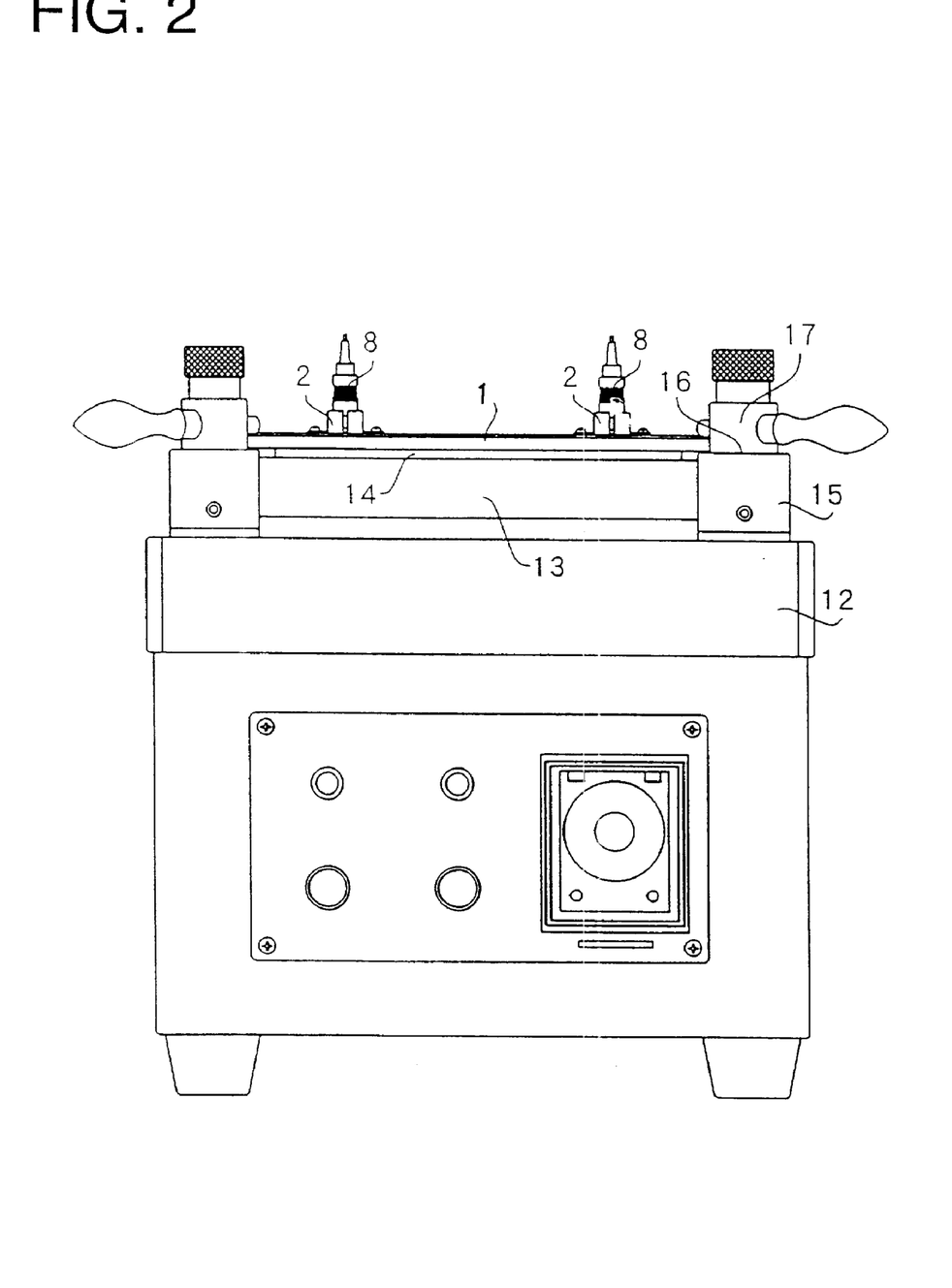
FIG. 2 is a front view of the optical-fiber-end-face grinding apparatus on which the ferrule holder assembly shown in FIG. 1 is mounted.

Embodiments of the ferrule holder assembly for the optical-fiber-end-face grinding apparatus according to the present invention will be described hereinbelow with reference to the drawings. FIG. 1 is a plan view of an embodiment of the ferrule holder assembly for the optical-fiber-end-face grinding apparatus according to the present invention. Adapters 2 for supporting 20 units of connector ferrules, the number of which corresponds to the number of the connector ferrules, are arranged round a concentric circle on a ferrule holder board 1 having a generally square shape, in which a circular hole is provided at the center. This ferrule holder assembly for the optical-fiber-end-face grinding apparatus is mounted on the optical-fiber-end-face grinding apparatus as shown in FIG. 2. A grinding apparatus main body 12 is provided with a grinding board 13 revolving on its axis and the orbit, on which a grinding film 14 is mounted.

Holder retaining stands 15 are provided at the upper four corners of the grinding apparatus main body 12, into which a holder retaining shaft 17 urged downwardly is respectively inserted in the center thereof.

When the ferrule holder board 1 is mounted, levers of the holder retaining shafts are each rotated so as to apply a strong force.

Holder-mounting reference surfaces 16 at the upper four surfaces of the holder retaining stands 15 are the same surface and are set to be parallel to a grinding surface of the grinding board. The height is set to $L_2$ (mm) from the grinding surface. The motion of the grinding board of the grinding apparatus is preferably a combined motion of the revolutions on its axis and the orbit; however, only an ordinary rotation is also possible.

Figure 3:
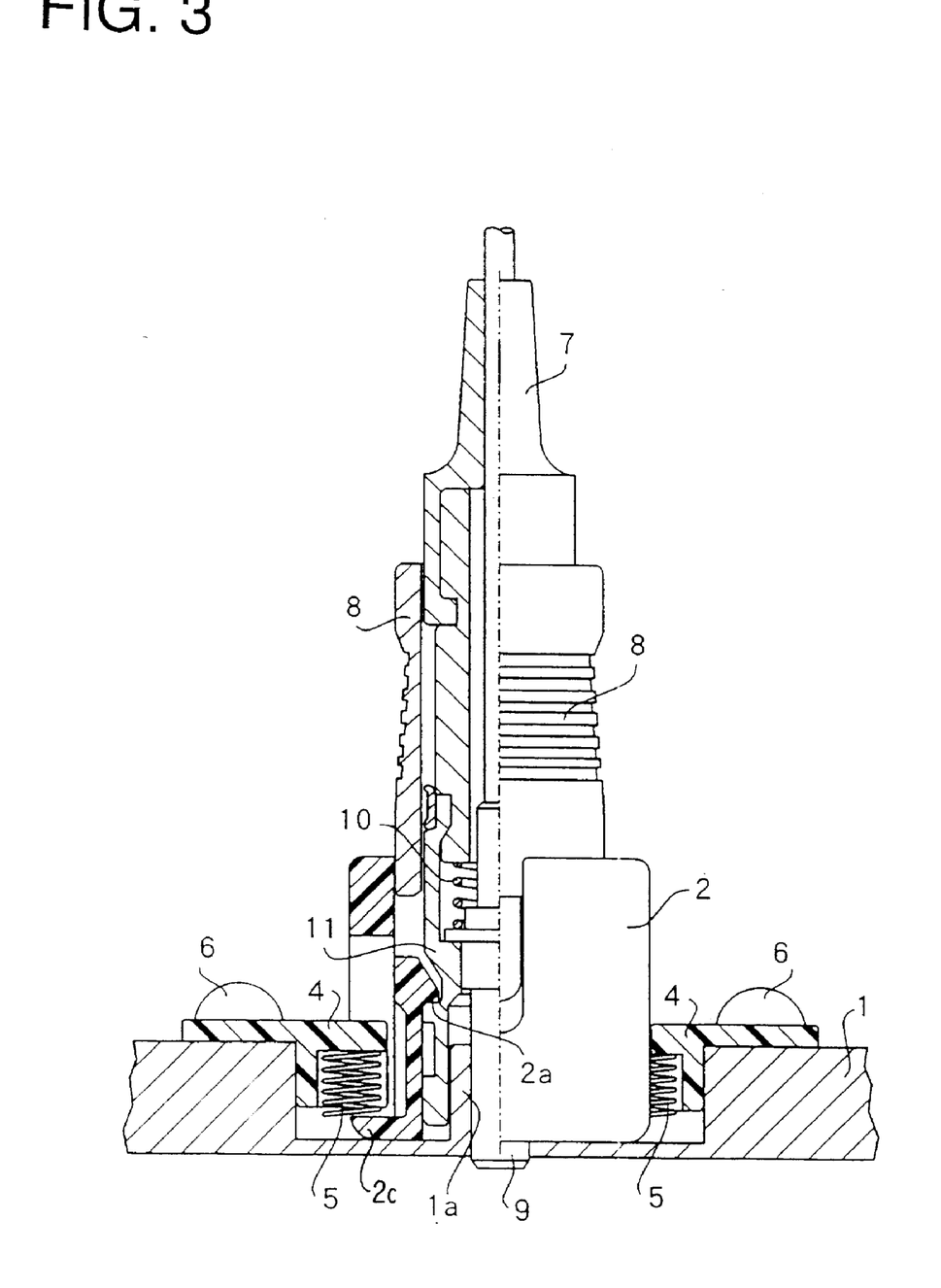
FIG. 3 is an enlarged view showing a state in which an SC-type optical fiber connector is attached to the embodiment of the ferrule holder assembly for the optical-fiber-end-face grinding apparatus shown in FIG. 1.
Figure 4:
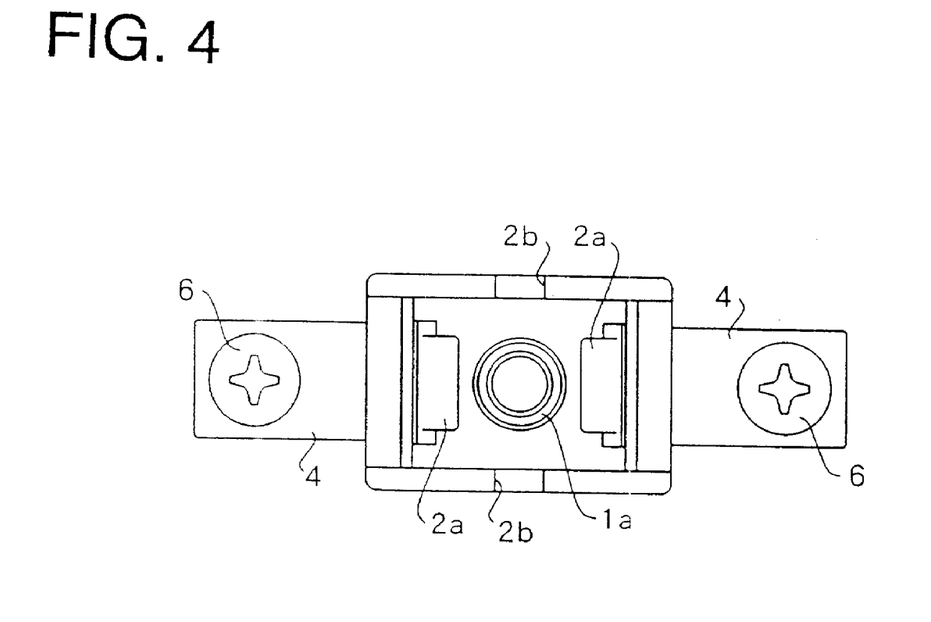
FIG. 4 is an enlarged plan view showing a state in which an optical fiber connector is not connected to the embodiment of the ferrule holder assembly for the optical-fiber-end-face grinding apparatus shown in FIG. 1.
Figure 5:
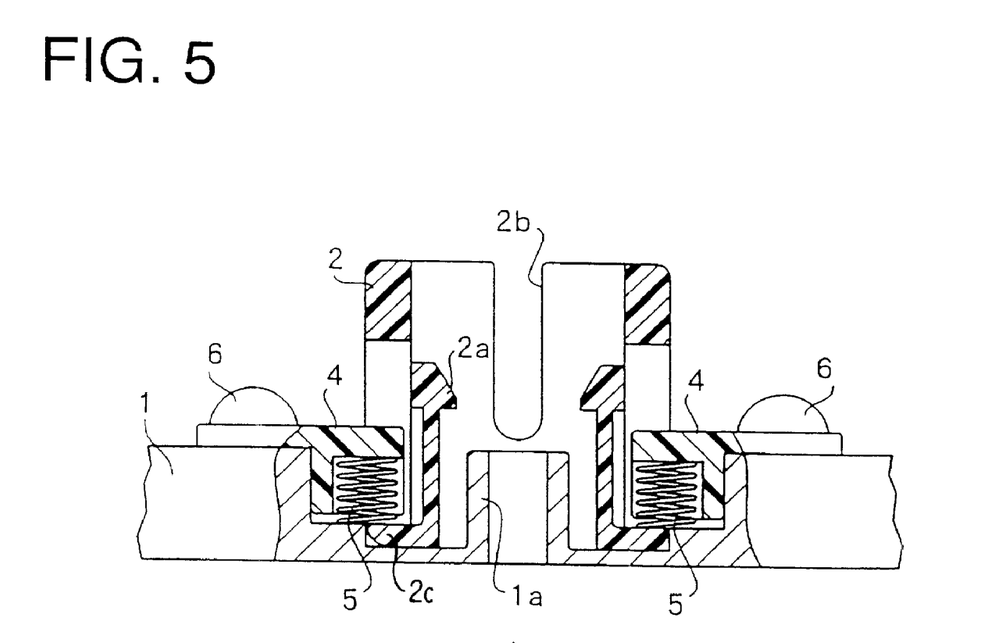
FIG. 5 is an enlarged cross-sectional view showing a state in which the optical fiber connector is not connected to the embodiment of the ferrule holder assembly for the optical-fiber-end-face grinding apparatus shown in FIG. 1.

FIG. 3 is an enlarged view showing a state in which an SC-type optical fiber connector is attached to the embodiment of the ferrule holder assembly for the optical-fiber-end-face grinding apparatus shown in FIG. 1. FIG. 4 is an enlarged plan view showing a state in which an optical fiber connector is not connected to the embodiment of the ferrule holder assembly for the optical-fiber-end-face grinding apparatus shown in FIG. 1. FIG. 5 is an enlarged cross-sectional view showing a state in which the connector is not connected as well. As shown in FIG. 5, recessed portions are formed in the ferrule holder board 1, corresponding to each connector retaining position, and a ferrule sleeve 1a of the holder board is provided at the center thereof, respectively.

The adapter 2 has a quadrangular cylinder shape and is inserted into the recessed portion in a manner so as to enclose the ferrule sleeve 1a as shown in FIGS. 4 and 5. A pair of key grooves 2b and 2b facing each other are formed at the side of the adapter 2. In addition, a pair of adapter hooks 2a is provided at the inside of the adapter 2, for retaining an SC-type connection plug that will be described later. An end of the adapter hook 2a is inclined, and the adapter hook 2a is elastically widened in response to insertion of the SC-type connection plug, and is then restored at a predetermined position to retain a plug body 11 of the SC-type optical fiber connector as shown in FIG. 3. Part of the walls at the short sides of the adapter 2 are removed at the lower sides, and a pair of adapter flanges (spring bearings) 2c for bearing a spring are provided thereat. A pair of adapter-spring pressing plates 4 are fixed to the ferrule holder board 1 using screws 6 in such a manner that the innermost ends of the plates overlie the upper sides of the pair of adapter flanges (spring bearings) 2c. A pair of adapter springs 5 are each inserted therebetween so as to urge the adapter 2 downwardly.

A ferrule 9 of the SC-type optical fiber connector plug is inserted between a plug body 11 and a flange 9a so as to be urged in a projecting direction by springs 10. An optical fiber cord, the tip of which is adhered to the ferrule 9, is led to the outside through a hood 7 covering the plug body 11. The operator holds a connector housing (pick-up portion) 8 that is provided separately from the plug body 11 to perform attaching/detaching operations to the adapter.

The plurality of optical fiber ferrules are attached to the embodiment of the ferrule holder assembly for the optical-fiber-end-face grinding apparatus shown in FIG. 1, and circular cutout portions for positioning at four corners of the ferrule holder board 1 are adjusted to the holder retaining stands 15 of the grinding apparatus, and then the holders are each sufficiently tightened by the holder retaining shaft 17 by rotating the mounting lever.

In this instance, if the projection amount $L_1$ of the ferrule from the lower end surface of the ferrule holder board 1 is set to an amount larger than a distance $L_2$ from the lower end surface of the ferrule holder board 1 to a surface of the grinding film, the tip of the ferrule is pressed up by the grinding film in a state in which the ferrule holder board 1 is tightened, and thereby the force of the adapter spring 5 is applied to the end face of the ferrule. Grinding is performed in this state.

When the grinding amount is 0.1 mm or less, the grinding is possible where $L_1-L_2>0.1$ mm; however, the features of the present invention is that even when the length of the ferrules varies, there is no need for adjustment particularly. Assuming that the variation in the length of the ferrules is 0.2 mm, a grinding margin of 0.1 mm can be assured even for the shortest ferrule where $L_1-L_2>0.3$ mm. The force of the coil spring 5 applied to the adapter is preferably 550 gf or less in the case of spherical grinding using an elastic material plate as the grinding board, and the spring characteristic is preferably within the above-mentioned variation, having no influence on the force.

Figure 6:
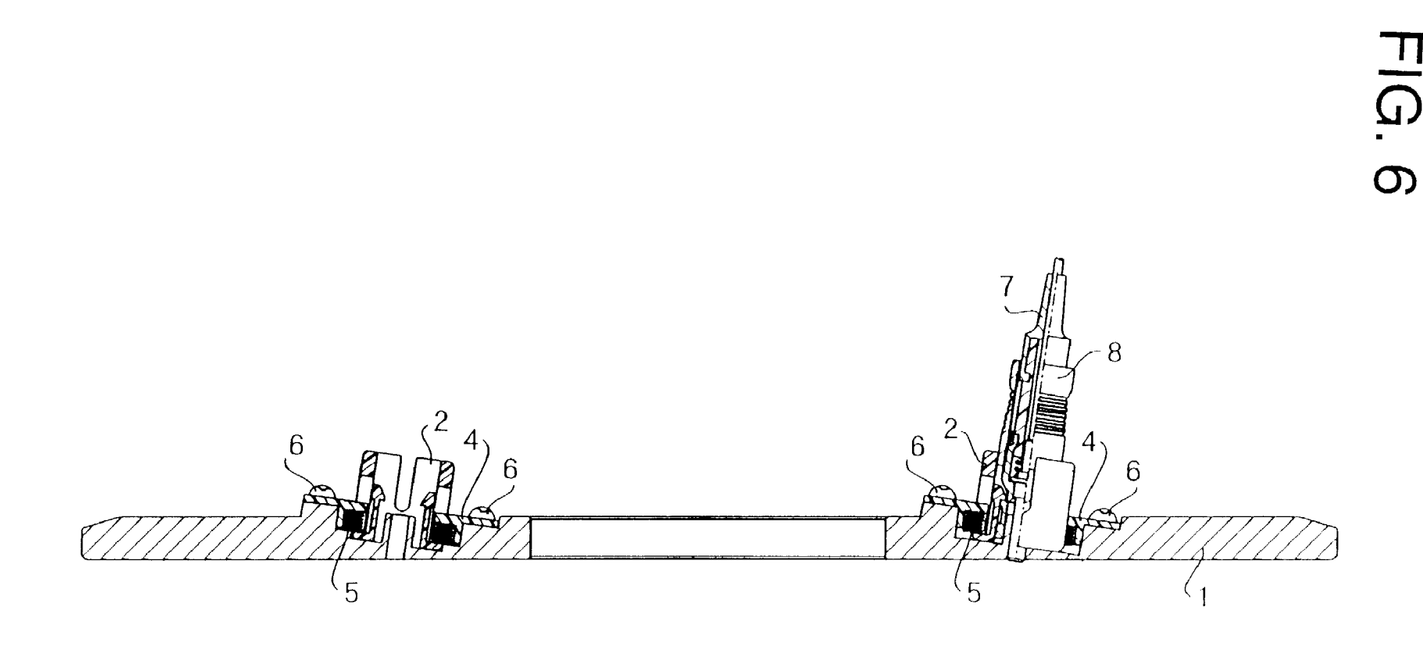
FIG. 6 is a cross sectional view of another embodiment (for inclined grinding) of the ferrule holder assembly for the optical-fiber-end-face grinding apparatus according to the present invention.

The above-described embodiment is an example of perpendicularly grinding of the tip of the ferrule together with the optical fiber. The ferrule holder assembly for the-optical-fiber-end-face grinding apparatus for inclined spherical grinding of the tip of the ferrule can be provided. FIG. 6 is a cross sectional view of a ferrule holder assembly for the inclined grinding. A hole for inserting the adapter 2 is processed to be inclined corresponding to the grinding angle. The key groove 2b for positioning in this case should be provided only at a predetermined side.

Figure 7:
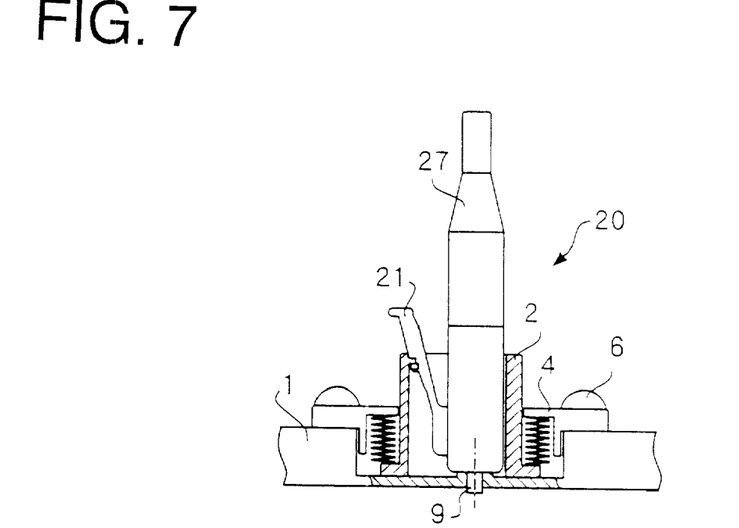
FIG. 7 is a cross sectional view showing a state in which a connector is connected to a still another embodiment (for grinding ferrules of an LC-type connector) of the ferrule holder assembly for the optical-fiber-end-face grinding apparatus according to the present invention.

FIG. 7 is a cross sectional view showing a state in which a connector is connected to another embodiment (for grinding the ferrule of an LC-type connector) of the ferrule holder assembly for the-optical-fiber-end-face grinding apparatus according to the present invention. An LC-type connector plug 20 is provided with a retaining hook lever 21, and a projection provide at the lever 21 is engaged with a projection at the inner surface of the adapter 2 so as to fix the LC-type connector plug 20 to the ferrule holder board. An optical fiber cord (not shown) is led out through a hood 27. In the drawing, description of the construction described previously with reference to FIG. 3 is omitted by giving common numerals or symbols. The same shall also apply to FIGS. 8, 9, 10.

Figure 8:
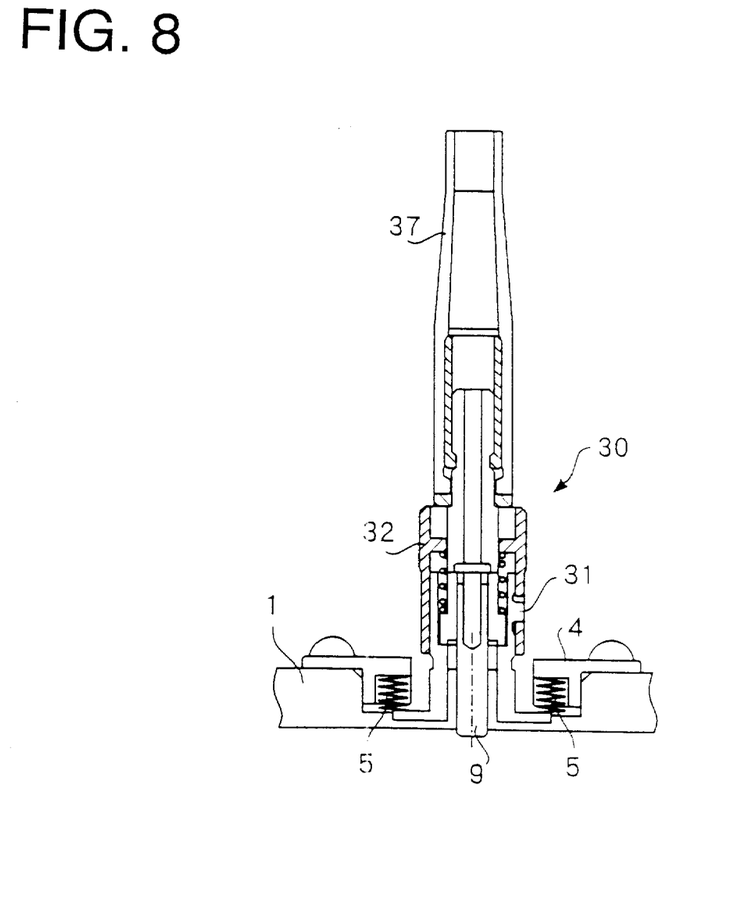
FIG. 8 is a cross sectional view of a further another embodiment (for grinding ferrules of an ST-type connector) of the ferrule holder assembly for the optical-fiber-end-face grinding apparatus according to the present invention.

FIG. 8 is a cross sectional view of another embodiment (for grinding a ferrule of an ST-type connector plug) of the ferrule holder assembly of the optical-fiber-end-face grinding apparatus according to the present invention. The ST-type connector plug 30 is provided with a key pin 31 at the adapter 2. The key pin has a cylinder 32 of the ST-type connector plug 30 connected thereto with a bayonet.

Figure 9:
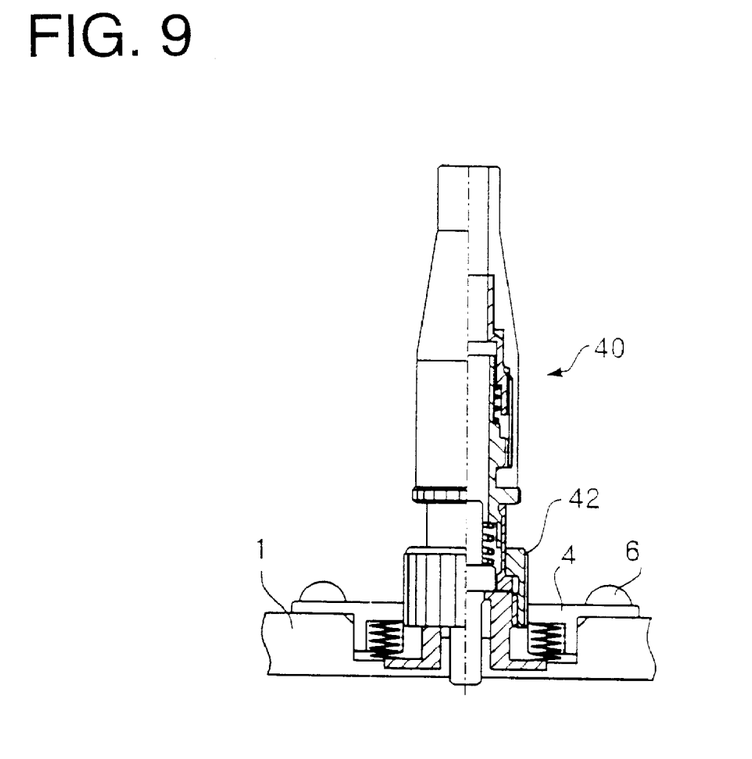
FIG. 9 is a cross sectional view of a still further another embodiment (for grinding ferrules of an FC-type connector plug) of the ferrule holder assembly for the optical-fiber-end-face grinding apparatus according to the present invention.

FIG. 9 is a cross sectional view of another embodiment (for grinding a ferrule of an FC-type connector plug) of the ferrule holder assembly of the optical-fiber-end-face grinding apparatus according to the present invention. The FC-type connector plug 40 can be retained to the adapter with a box nut 42.

Figure 10:
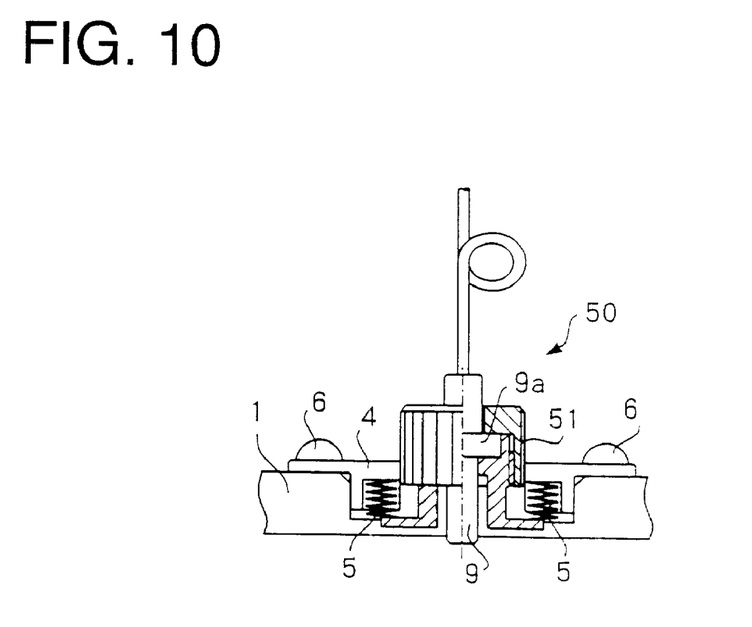
FIG. 10 is a cross sectional view of a yet further another embodiment (a ferrule with a flange) of the ferrule holder assembly for the optical-fiber-end-face grinding apparatus according to the present invention.

FIG. 10 is a cross sectional view of another embodiment (a ferrule with a flange) of the ferrule holder assembly of the optical-fiber-end-face grinding apparatus according to the present invention. This is a case of grinding the ferrule (a single body) 9 with the flange 9a, which can be retained to the adapter with a box nut 51.

As described above in detail, in the grinding apparatus using the assembly according to the present invention, the projection amount of the ferrule is made the same in a state in which the assembly is attached to the grinding apparatus within a variation in the projection amount by disposing a separate spring to each adapter. That is, even if the lengths of the ferrules varies, grinding can be performed without preliminary grinding, and as a result, uniform grinding can be performed for a short time without unnecessary labor. In addition, attaching the connector to the adapter facilitates the attachment/detachment, resulting in an improved workability.

What is claimed is:

1. A ferrule holder assembly for an optical-fiber-end-face grinding apparatus having a substantially planar grinding board, comprising a ferrule holder board adapted to be mounted substantially parallel to the grinding board, said ferrule holder board having upper and lower surfaces, a plurality of recesses formed in the upper surface of the ferrule holder board, a plurality of adapters each mounted in a respective recess and supporting an optical fiber ferrule, each optical fiber ferrule having an axis and a ferrule tip confronting the grinding board and extending along said axis, the axis of each optical fiber ferrule being fixed relative to the ferrule holder board and the grinding board, the optical fiber ferrule being movable along its axis relative to the ferrule holder board, a pressing plate fastened to the ferrule holder board for retaining each adapter in its respective recess, a pair of coil springs disposed between the pressing plate and each adapter, said springs urging such adapter and the optical fiber ferrule associated therewith in a direction along said axis toward said grinding board.

2. A ferrule holder assembly for an optical-fiber-end-face grinding apparatus according to claim 1, including a ferrule sleeve centrally located in each recess through which a respective optical fiber ferrule extends with its ferrule tip confronting the grinding board.

3. A ferrule holder assembly for an optical-fiber-end-face grinding apparatus according to claim 1, wherein a retaining part of each adapter has a hook structure corresponding to a retaining member of a plug-type optical fiber connector housing.

4. A ferrule holder assembly for an optical-fiber-end-face grinding apparatus according to claim 1, wherein a retaining part of each adapter has a screw structure corresponding to a retaining member of a plug-type optical-fiber connector housing.

5. A ferrule holder assembly for an optical-fiber-end-face grinding apparatus according to claim 1, wherein the fixed axis of each optical fiber ferrule is substantially perpendicular to the ferrule holder board.

6. A ferrule holder assembly for an optical-fiber-end-face grinding apparatus according to claim 1, wherein the fixed axis of each optical fiber ferrule is inclined relative to the ferrule holder board.

7. A ferrule holder assembly for an optical-fiber-end-face grinding apparatus according to claim 1, wherein each adapter has a quadrangular cylinder shape and is non-rotatably mounted to the ferrule holder board.

8. A ferrule holder assembly for an optical-fiber-end-face grinding apparatus according to claim 1, wherein the adapters are mounted to the ferrule holder board along a circular locus.

9. A ferrule holder assembly for an optical-fiber-end-face grinding apparatus according to claim 2, wherein each adapter is non-rotatably disposed in its respective recess in the ferrule holder board.

* * * * *